No. 115,278

UNITED STATES PATENT OFFICE.

GEORGE A. BURROUGH, OF PROVIDENCE, RHODE ISLAND.

IMPROVEMENT IN THE MANUFACTURE OF ARTICLES OF ENAMELED METALS.

Specification forming part of Letters Patent No. 115,278, dated May 30, 1871.

*To all whom it may concern:*

Be it known that I, GEORGE A. BURROUGH, of Providence, in the State of Rhode Island, have invented or produced a new manufacture; and I do hereby declare that the following is a full, clear, and exact description thereof.

The new manufacture which I claim to have produced is exhibited in articles of metal, such as pipes and fittings, couplings, elbows, &c., used for water or gas, submerged pumps, letters for signs, and the cardinal numbers or figures for numbering houses or streets, coated with a peculiar enamel, the effect of which is to give to such articles properties and qualities which they did not possess before.

The first operation is to thoroughly cleanse the articles from all impurities by the use of alkalies or acids and then washing in clean water, and, when dried, to apply inside and out a coating of enameling compound, which is to be prepared and applied as more particularly described in the Letters Patent granted to Charles L. Robertson, dated April 2, 1867, to which reference may be had.

The result is, articles distinguished by their smooth and glossy appearance, rendering them impervious to moisture, giving them a surface able to resist the action of impure liquids and all atmospheric influences, which I call improved manufactures of enameled metal.

I do not mean to be understood as confining myself to the employment of a composition of the same elements, in the same proportions described in said Robertson's patent; but any other composition of the same general character, possessing the same qualities, and capable, upon the application of heat, to develop a luster, may be used.

Articles rendered impervious to the weather by means of applications of paints, oils, varnishes, and ethereal japans, or other similar compounds hardened by the ordinary exposure to evaporation, are not new.

My invention differs from all such in the fact that by developing the luster with heat a surface is formed not only water-proof, but, in a degree, vulcanized, and possessing the power to resist all corroding influences.

What I claim as my invention, and desire to secure by Letters Patent of the United States as a new manufacture, is—

Articles of metal coated with an enameling compound, substantially as described, and developing such compound by heat, as herein set forth, and for the purposes specified.

GEO. A. BURROUGH.

Witnesses:
   WILLIAM APLIN,
   L. M. APLIN.